"" (12) United States Patent
Ly-Gagnon et al.

(10) Patent No.: US 8,817,717 B2
(45) Date of Patent: Aug. 26, 2014

(54) CONCURRENT BACKGROUND SPECTRAL SCANNING FOR BLUETOOTH PACKETS WHILE RECEIVING WLAN PACKETS

(75) Inventors: Yann Ly-Gagnon, San Jose, CA (US); Konstantinos Aretos, San Francisco, CA (US); Xiaoru Zhang, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 383 days.

(21) Appl. No.: 13/101,533

(22) Filed: May 5, 2011

(65) Prior Publication Data

US 2012/0281638 A1 Nov. 8, 2012

(51) Int. Cl.
*H04W 4/00* (2009.01)
(52) U.S. Cl.
USPC .......................................................... 370/329
(58) Field of Classification Search
USPC .................................. 370/329, 310, 318, 464
See application file for complete search history.

(56) References Cited

U.S. PATENT DOCUMENTS

| | | | | |
|---|---|---|---|---|
| 5,426,696 | A * | 6/1995 | Zimbrek ........................ | 379/386 |
| 7,929,508 | B1 | 4/2011 | Yucek et al. | |
| 2004/0194103 | A1 * | 9/2004 | Wang et al. .................... | 718/100 |
| 2006/0292987 | A1 * | 12/2006 | Ophir et al. ................... | 455/41.2 |
| 2008/0175199 | A1 * | 7/2008 | Shao et al. ..................... | 370/329 |
| 2009/0111496 | A1 | 4/2009 | Ibrahim et al. | |
| 2009/0112492 | A1 * | 4/2009 | Ibrahim et al. ................. | 702/57 |
| 2010/0040121 | A1 * | 2/2010 | Duerdodt et al. ............. | 375/219 |
| 2010/0120362 | A1 | 5/2010 | Walley et al. | |
| 2010/0190506 | A1 * | 7/2010 | To et al. ..................... | 455/452.1 |
| 2013/0006510 | A1 * | 1/2013 | Young et al. ................... | 701/119 |

FOREIGN PATENT DOCUMENTS

EP 2056486 A2 5/2009

OTHER PUBLICATIONS

International Search Report and Written Opinion—PCT/US2012/036692—ISA/EPO—Aug. 24, 2012, 13 pages.

\* cited by examiner

*Primary Examiner* — Andrew Lai
*Assistant Examiner* — Zhiren Qin
(74) *Attorney, Agent, or Firm* — DeLizio Gilliam, PLLC

(57) ABSTRACT

A Bluetooth detection unit can be implemented to minimize the time required for executing the inquiry and paging scan procedures on a Bluetooth device associated with a collocated WLAN device. The Bluetooth detection unit can execute concurrent background spectral scanning to detect Bluetooth control packets while the WLAN device is receiving WLAN packets. The Bluetooth detection unit can analyze, for each Bluetooth control channel, the Bluetooth device can determine energy measurements associated with each Bluetooth control channel and can determine whether each Bluetooth control channel comprises a narrowband signal based, at least in part, on frequency domain samples associated with an RF signal received at the WLAN device. The Bluetooth detection unit can determine which of the Bluetooth control channels comprise a Bluetooth control packet.

29 Claims, 7 Drawing Sheets

CONCURRENT BACKGROUND SPECTRAL SCANNING FOR BLUETOOTH PACKETS WHILE RECEIVING WLAN PACKETS

BACKGROUND

Embodiments of the inventive subject matter generally relate to the field of wireless communication and, more particularly, to concurrent background spectral scanning for Bluetooth® packets while receiving WLAN packets.

A master Bluetooth device uses an inquiry scan procedure to discover other slave Bluetooth devices within communication range and uses a paging scan procedure to connect to one or more of the discovered slave Bluetooth devices. The master Bluetooth device and the slave Bluetooth devices exchange inquiry messages and paging messages on one or more narrowband radio frequency channels. Wireless local area network (WLAN) devices use wideband transmission techniques that may employ the same radio frequency channels as the Bluetooth devices. For example, both the WLAN devices and the Bluetooth devices can use the 2.4 GHz-2.5 GHz industrial scientific medical (ISM) frequency band. The Bluetooth devices can frequency hop across 79 1 MHz narrowband radio frequency channels, while the WLAN devices can occupy a 20 MHz (or 40 MHz) radio frequency channel.

SUMMARY

Various embodiments for concurrent background spectral scanning for Bluetooth packets while receiving WLAN packets are disclosed. In one embodiment, a plurality of frequency domain samples associated with a radio frequency (RF) signal received at a first network communication unit of a wireless communication device are determined. The wireless communication device comprises the first network communication unit and a second network communication unit. A plurality of control channels are identified from a plurality of communication channels associated with the second network communication unit. Energy measurements associated with each control channel of the plurality of control channels associated with the second network communication unit are determined. For each control channel of the plurality of control channels associated with the second network communication unit, it is also determined whether the control channel comprises a narrowband signal. For each control channel of the plurality of control channels associated with the second network communication unit, it is determined whether the control channel comprises a control packet associated with the second network communication unit based, at least in part, on the energy measurements associated with the control channel and on whether the control channel comprises a narrowband signal.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
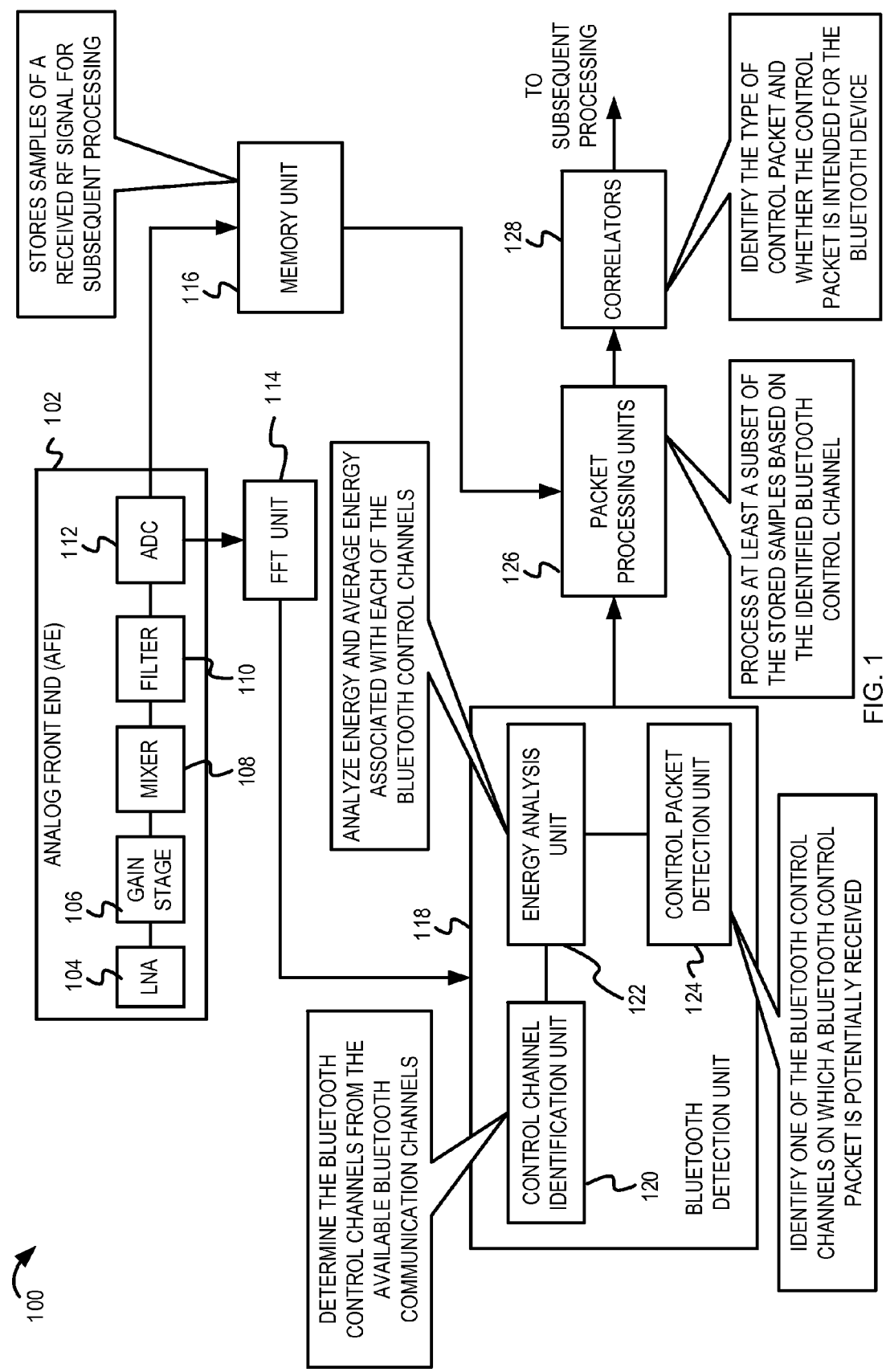
FIG. 1 is an example block diagram illustrating a mechanism for concurrent background spectral scanning for Bluetooth packets while receiving WLAN packets.

The description that follows includes exemplary systems, methods, techniques, instruction sequences, and computer program products that embody techniques of the present inventive subject matter. However, it is understood that the described embodiments may be practiced without these specific details. For instance, although examples refer to scanning for Bluetooth control packets while receiving WLAN packets, embodiments are not so limited. In other embodiments, operations for background spectral scanning for detection of control packets as described herein can be implemented by other communication standards and devices (e.g., a Bluetooth device associated with a collocated WiMAX device). In other instances, well-known instruction instances, protocols, structures, and techniques have not been shown in detail in order not to obfuscate the description.

A slave Bluetooth device, in accordance with the Bluetooth specification, typically executes an inquiry scan procedure and a paging scan procedure at regular intervals. For example, to establish a Bluetooth communication link with a master Bluetooth device, the slave Bluetooth device typically listens for paging requests (from the master Bluetooth device) for 11.25 milliseconds every 1.28 seconds. In other words, the slave Bluetooth device may switch from a low power state to an active power state to listen for paging requests for 11.25 milliseconds every 1.28 seconds. Furthermore, because the slave Bluetooth device is typically unaware of the Bluetooth communication channel on which the master Bluetooth device will transmit the inquiry/paging packets at a particular time instant, the slave Bluetooth device tunes to one predetermined Bluetooth communication channel and waits to receive the inquiry/paging packets on that predetermined Bluetooth communication channel from the master Bluetooth device. The existing techniques for executing the inquiry and paging scan procedures can be time-consuming, can result in an increase in power consumed by the slave Bluetooth device, and can utilize complicated coexistence procedures when the slave Bluetooth device is collocated with a WLAN device. Moreover, when the slave Bluetooth device gains control of the communication medium to scan for paging packets (or inquiry packets), the collocated WLAN is typically precluded from transmitting or receiving WLAN packets, resulting in a loss of throughput at the WLAN device.

Functionality can be implemented to speed up the inquiry and paging scan procedure and to reduce the amount of time required to detect inquiry packets and paging packets ("Bluetooth control packets") intended for the slave Bluetooth device. A fast Fourier transform (FFT) unit typically generates frequency domain samples of an incoming RF signal ("RF signal frequency samples") as part of processing a WLAN incoming RF signal. In some embodiments, a Bluetooth detection unit can analyze multiple Bluetooth communication channels simultaneously by analyzing the RF signal frequency samples generated by the FFT unit. The Bluetooth detection unit can identify one or more Bluetooth communication channels ("Bluetooth control channels") on which the slave Bluetooth device can receive the Bluetooth control packets. The Bluetooth detection unit can analyze the energy associated with each of the Bluetooth control channels to determine whether a Bluetooth control packet was potentially received on the Bluetooth control channel. The Bluetooth detection unit can indicate which of the Bluetooth control channels should be further analyzed to determine whether the potential Bluetooth control packet is intended for the slave Bluetooth device. Memory units can be implemented on the slave Bluetooth device to store and process a predetermined number of the RF signal samples. Storing the RF signal samples may preclude the need for directly providing the RF signal samples to the correlators as soon as the Bluetooth detection unit detects a potential Bluetooth control packet, and may also prevent the correlators from being locked onto (or reserved for) the Bluetooth control channel until it is determined whether the detected Bluetooth control packet is intended for the Bluetooth device. Furthermore, by storing the RF signal samples in the memory units, multiple Bluetooth control packets can be detected on corresponding multiple Bluetooth control channels, at least one of the Bluetooth control channels can be selected (e.g., based on predefined criteria), and a predetermined number (e.g., 90 microseconds) of the corresponding RF signal samples can be processed at full speed in accordance with the selected Bluetooth control channel.

Such a process for identifying Bluetooth control packets while receiving WLAN packets can reduce power consumption associated with the slave Bluetooth device, can reduce the time required for executing the inquiry/paging scan procedure, and can selectively allow the slave Bluetooth device to gain control of the communication medium when a Bluetooth control packet intended for the slave Bluetooth device is detected. Moreover, in some implementations, by configuring the Bluetooth detection unit to continuously perform background scans for detecting Bluetooth control packets, the number of times that the slave Bluetooth device scans for and detects the Bluetooth control packets may increase, which may result in an improvement in response time and better user experience. Furthermore, coexistence issues can be minimized because the WLAN device can continuously receive WLAN packets without periodic interruptions from the slave Bluetooth device requesting access to the communication medium to initiate the inquiry/paging scan procedure. This can improve the performance of the WLAN device.

FIG. 1 is an example block diagram illustrating a mechanism for concurrent background spectral scanning for Bluetooth packets while receiving WLAN packets. FIG. 1 depicts an example receiver processing unit 100 of a dual-radio communication device (not shown). The dual-radio communication device can comprise a Bluetooth device and a WLAN device. In one implementation, the Bluetooth device and the WLAN device can be embodied on distinct integrated circuits (e.g., distinct Bluetooth and WLAN chips) on a common circuit board (or on separate circuit boards in close proximity to each other). In other implementations, the Bluetooth device and the WLAN device can be embodied on a single integrated circuit (e.g., a system on a chip (SoC)). The Bluetooth device and the WLAN device can be included within various types of electronic devices with wireless communication capabilities (e.g., mobile phones, notebook computer, tablet computers, gaming consoles, desktop computers, etc.). Furthermore, the Bluetooth device and the WLAN device can share one or more processing components of the receiver processing unit 100. The receiver processing unit 100 of FIG. 1 comprises an analog front end (AFE) 102, which may be shared by the Bluetooth device and the WLAN device. In one example, as depicted in FIG. 1, the AFE 102 can comprise a low noise amplifier (LNA) 104, one or more gain stages 106, a mixer 108, one or more filter stages 110, and an analog to digital converter (ADC) 112. The output of the ADC 112 is coupled with a fast Fourier transform (FFT) unit 114 and with a memory unit 116. The FFT unit 114 is coupled with a Bluetooth detection unit 118. The Bluetooth detection unit 118 comprises a control channel identification unit 120, an energy analysis unit 122, and a control packet detection unit 124. The Bluetooth detection unit 118 is coupled with a packet processing unit 126 which, in turn, is coupled with one or more correlators 128. As will be described below in FIGS. 1-6, the Bluetooth detection unit 118 can detect Bluetooth control packets (e.g., inquiry/page requests) and can identify the Bluetooth communication channels on which each of the Bluetooth control packets were detected, while the receiver processing unit 100 is receiving a WLAN signal.

Although not depicted in FIG. 1, the receiver processing unit 100 can also comprise an antenna and one or more other analog or digital processing units. The antenna can receive an incoming RF signal (comprising a WLAN packet), the LNA 104 can amplify the received RF signal, and the gain stages 106 can further amplify the received RF signal. The mixer 108 can down-convert the received RF signal, the filter stages 110 can filter the received RF signal, and the ADC 112 can convert the analog received RF signal into a corresponding digital representation of the received RF signal. In other words, the ADC 112 can sample the received RF signal to generate time domain samples of the received RF signal ("RF signal samples"). The RF signal samples at the output of the ADC 112 can also be stored in the memory unit 116. As will be further described below, storing the RF signal samples in the memory unit 116 can enable multiple Bluetooth control packets to be detected on corresponding multiple Bluetooth communication channels and can ensure that the RF signal samples are processed in accordance with at least one Bluetooth communication channel (selected based on predefined criteria). The FFT unit 114 also receives the RF signal samples and converts the RF signal samples from the time domain into the frequency domain to yield frequency domain samples of the received RF signal ("RF signal frequency samples"). Depending on the sampling rate of the ADC 112 and the processing speed of the FFT unit 114, the FFT unit 114 typically generates a plurality of frequency bins, where each of the frequency bins comprises a set of RF signal frequency samples. For example, the FFT unit 114 may generate 128 frequency bins if the FFT unit 114 is configured to generate a 128 point FFT and if the ADC 112 operates with a sampling rate of 128 MHz. One or more of the frequency bins can also correspond to a Bluetooth communication channel. For example, 128 RF signal frequency samples may be generated every 1 microsecond (i.e., with a frequency of 1 MHz) if the FFT unit 114 generates a 128 point FFT and if the ADC 112 operates with a sampling rate of 128 MHz. Thus, in this example, each frequency bin can correspond to one Bluetooth communication channel. The RF signal frequency samples are then provided to the Bluetooth detection unit 118 for subsequent detection of Bluetooth control packets on one or more Bluetooth communication channels.

Bluetooth devices typically operate by hopping across 79 narrowband (1 MHz) Bluetooth communication channels. For establishing (or maintaining) a Bluetooth communication link during a during an inquiry (or paging) procedure, the Bluetooth devices typically exchange Bluetooth control packets (e.g., inquiry requests, inquiry responses, page requests, page responses) on a subset of the Bluetooth communication channels, herein referred to as "Bluetooth control channels". In FIG. 1, the control channel identification unit 120 identifies the Bluetooth control channels from the available Bluetooth communication channels based, at least in part, on an address associated with the Bluetooth device (e.g., a general inquiry access code (GIAC) address or a Bluetooth device (BD) address) and the WLAN channel on which the collocated WLAN device is scheduled to receive WLAN packets. Additionally, after the control channel identification unit 120 identifies the Bluetooth control channels from the available Bluetooth communication channels, the control channel identification unit 120 can also identify a subset of frequency bins generated by the FFT unit 114 (and consequently the RF signal frequency samples) that are associated with each of the Bluetooth control channels. In some implementations, the control channel identification unit 120 may indicate that only the RF signal frequency samples within the subset of frequency bins that correspond to each of the Bluetooth control channels should be stored in the memory unit 116. The control channel identification unit 120 can also notify the energy analysis unit 122 of the Bluetooth control channels (or the subset of frequency bins that correspond to the Bluetooth control channels) that are to be analyzed.

The energy analysis unit 122 analyzes a current energy and an average energy associated with each of the Bluetooth control channels. The energy analysis unit 122 can identify the RF signal frequency samples that correspond to each of the Bluetooth control channels. The energy analysis unit 122 can calculate the current energy associated with each of the Bluetooth control channels based on the corresponding RF signal frequency samples, as will be described below in FIG. 2. The energy analysis unit 122 can also calculate the average energy associated with each of the Bluetooth control channels based on the corresponding RF signal frequency samples received across a predetermined time interval. The energy analysis unit 122 can provide an indication of the current energy and the average energy associated with each of the Bluetooth control channels to the control packet detection unit 124 to enable the control packet detection unit 124 to determine whether a Bluetooth control packet was received on one or more of the Bluetooth control channels.

Based on the current energy and the average energy associated with each of the Bluetooth control channels, the control packet detection unit 124 can determine whether an energy jump was detected (and consequently whether a Bluetooth control packet was potentially received) on any of the Bluetooth control channels. The control packet detection unit 124 can determine whether the difference between the current energy associated with the Bluetooth control channel and the average energy associated with the Bluetooth control channel is greater than a predetermined energy jump threshold. If so, the control packet detection unit 124 can determine that a Bluetooth control packet was detected on the Bluetooth control channel. Furthermore, to help ensure that the detected packet is a Bluetooth control packet, the control packet detection unit 124 can determine whether the detected packet corresponds to a narrowband signal. As will be described below in FIG. 3, in some implementations, the control packet detection unit 124 can compare the energy associated with Bluetooth communication channels that are adjacent to the Bluetooth control channel under consideration ("adjacent Bluetooth communication channels") against a narrowband energy threshold. If the energy associated with the adjacent Bluetooth communication channels is less than the narrowband energy threshold, the control packet detection unit 124 can determine that a Bluetooth control packet was detected on the Bluetooth control channel. The control packet detection unit 124 can also use the current energy and the average energy associated with each of the Bluetooth control channels to determine a starting time instant associated with the detected Bluetooth control packet. As will be further described in FIGS. 4-5, the control packet detection unit 124 can store a detection flag to identify each Bluetooth control channel on which a Bluetooth control packet was detected. If more than one Bluetooth control channel is deemed to comprise a Bluetooth control packet, the control packet detection unit 124 can select the Bluetooth control channel associated with the highest energy for subsequent analysis. The control packet detection unit 124 can provide an indication (to the packet processing units 126) of the Bluetooth control channel on which the Bluetooth control packet was detected, which can be used to analyze the RF signal samples.

The packet processing unit 126 processes at least a subset of the stored RF signal samples based on the Bluetooth control channel indicated by the control packet detection unit 124. As will further be described with reference to FIGS. 4 and 6, the packet processing unit 126 can access a subset of the RF signal samples from the memory units 116 and can align the accessed RF signal samples to the Bluetooth control channel identified by the control packet detection unit 124. The packet processing unit 126 can also filter, down-sample, down-convert, amplify, and finally provide the processed RF signal samples to the correlators 128. In some implementations, the correlators 128 can identify the type of Bluetooth control packet (i.e., inquiry or paging request packet) and can determine whether the Bluetooth control packet is intended for the Bluetooth device. As will further be described in FIGS. 4 and 6, the correlators 128 can correlate the RF signal samples with a GIAC address and with a BD address to determine whether the Bluetooth control packet comprises an inquiry request or a page request, respectively, intended for the Bluetooth device. If the correlation is successful, the Bluetooth device can generate and transmit an inquiry or page response message.

Figure 2:
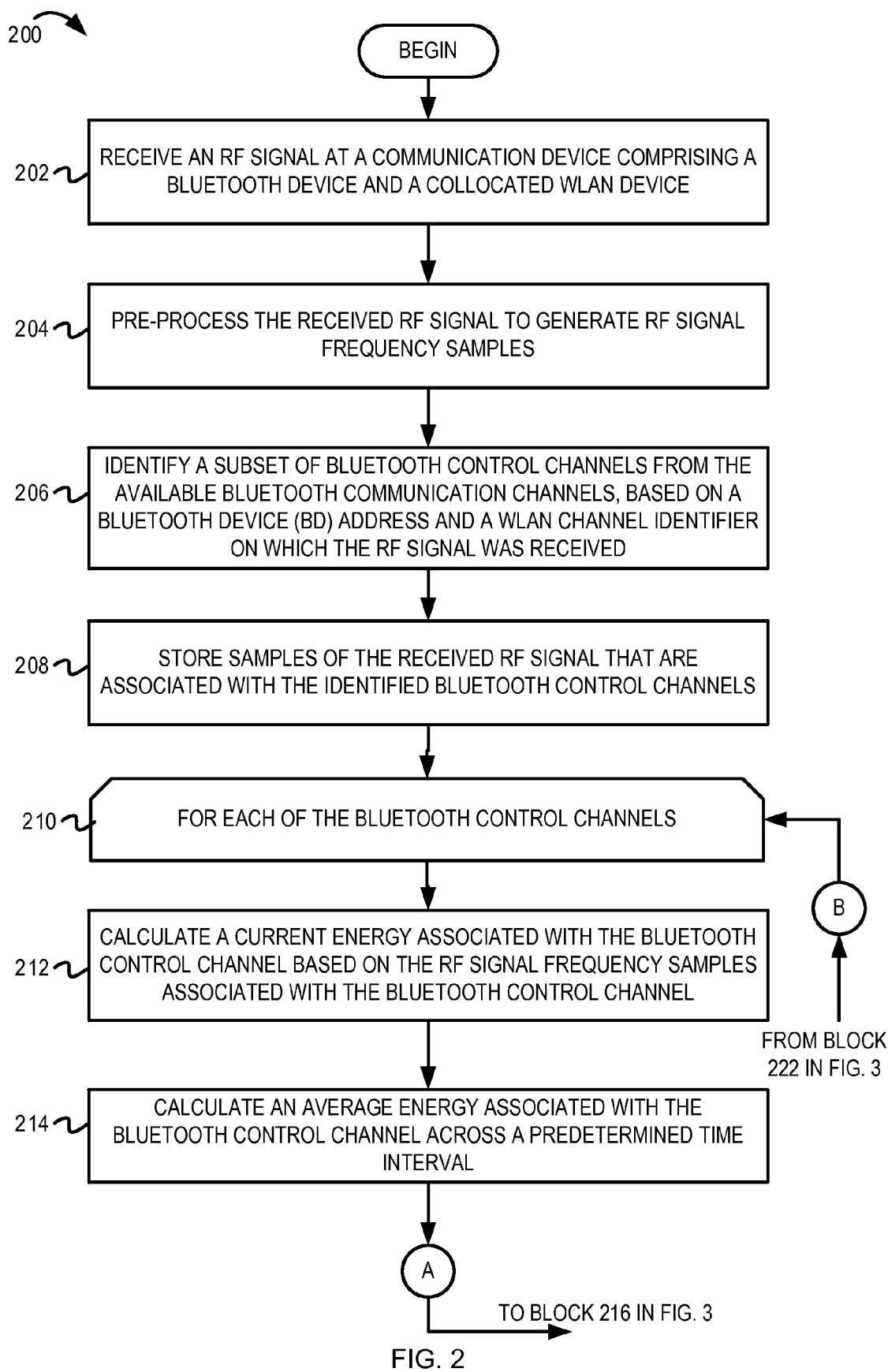
FIG. 2 is a flow diagram illustrating example operations for detecting Bluetooth control packets during WLAN packet reception.
Figure 3:
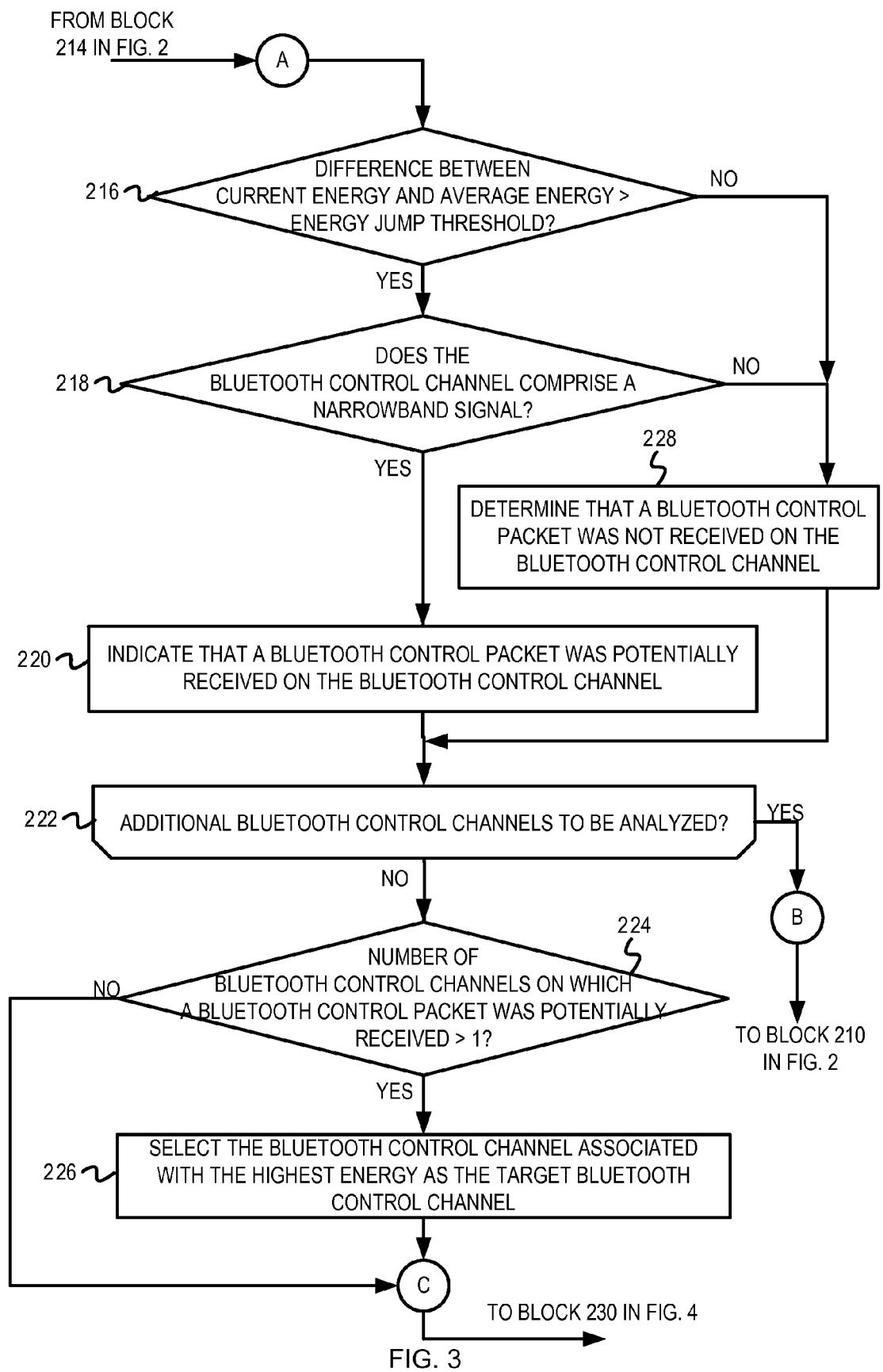
FIG. 3 is a continuation of FIG. 2 and also illustrates example operations for detecting Bluetooth control packets during WLAN packet reception.
Figure 4:
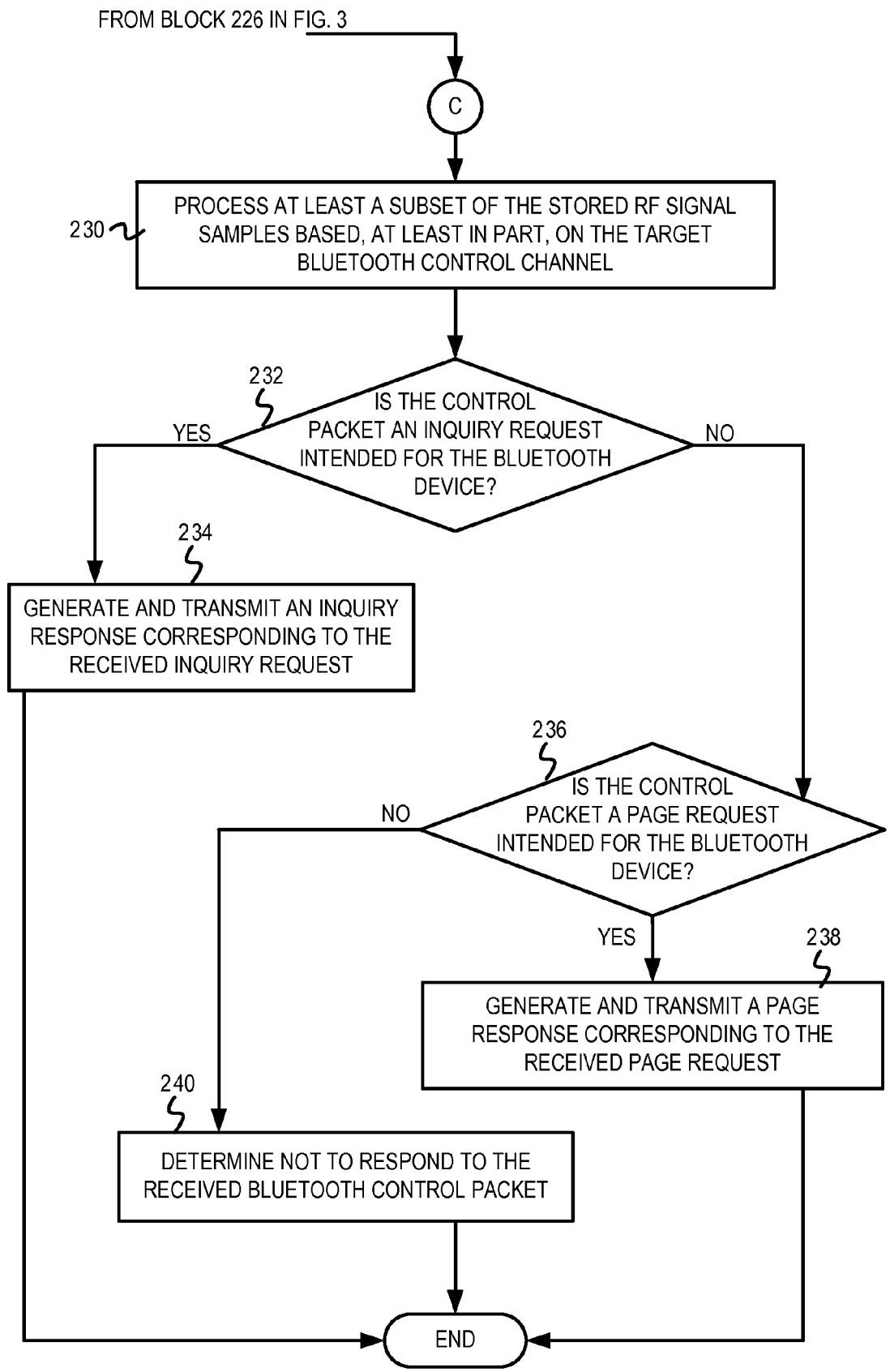
FIG. 4 is a continuation of FIG. 3 and also illustrates example operations for detecting Bluetooth control packets during WLAN packet reception.

FIG. 2, FIG. 3, and FIG. 4 depict a flow diagram ("flow") 200 illustrating example operations for detecting Bluetooth control packets during WLAN packet reception. The flow 200 begins at block 202 in FIG. 2.

At block 202, an RF signal is received at a communication device that comprises a Bluetooth device and a collocated WLAN device. For example, one or more antennas shared by the Bluetooth device and the collocated WLAN device can receive the RF signal. The RF signal may be received during a time interval allocated for WLAN device communication. As will be described below, the RF signal can be analyzed to identify one or more Bluetooth communication channels that could potentially comprise Bluetooth control packets intended for the Bluetooth device. The flow continues at block 204.

At block 204, the received RF signal is pre-processed to generate RF signal frequency samples. For example, as described above with reference to FIG. 1, the AFE 102 can generate the RF signal samples. The FFT unit 114 can then convert the RF signal samples from the time domain to the frequency domain to yield the RF signal frequency samples. As described above, the FFT unit 114 receives the RF signal samples from the ADC 112 and generates a corresponding FFT sample block comprising a plurality of frequency bins, where each frequency bin comprises a set of RF signal frequency samples. The flow continues at block 206.

At block 206, a subset of Bluetooth control channels are identified from the available Bluetooth communication channels. The control channel identification unit 120 can first determine the Bluetooth communication channels that are available to the Bluetooth device in accordance with a predetermined algorithm (e.g., a predetermined frequency hopping algorithm described by the Bluetooth specification). The control channel identification unit 120 then identifies the subset of Bluetooth control channels from the available Bluetooth communication channels. As described above, the Bluetooth control channels can include Bluetooth communication channels on which the Bluetooth device is programmed to transmit/receive paging requests, paging responses, inquiry requests, and inquiry responses to/from other Bluetooth devices. The Bluetooth control channels may be distributed across the entire Bluetooth communication frequency band and may be dependent on the address associated with the Bluetooth device ("BD address"). In one implementation, the control channel identification unit 120 can identify the Bluetooth control channels from the available Bluetooth communication channels based on the BD address and based on knowledge of the WLAN communication channel on which the RF signal was received. In other words, based on the WLAN communication channel on which the RF signal was received, a different range of Bluetooth communication channels may be accessible (or "visible") to the Bluetooth detection unit 118. For example, if the WLAN device receives the RF signal on WLAN channel 6 (with a center frequency of 2437 MHz and a 22 MHz bandwidth), only the Bluetooth communication channels within the frequency range 2415 MHz-2459 MHz may be visible to the Bluetooth detection unit 118. Accordingly, the control channel identification unit 120 can identify the Bluetooth control channels that lie within the 2415 MHz-2459 MHz frequency range. In one implementation, the control channel identification unit 120 can access a pre-determined lookup table to identify the Bluetooth control channels. In another implementation, the control channel identification unit 120 can determine the Bluetooth control channels in accordance with any suitable predetermined channel selection algorithm.

In some implementations, the control channel identification unit 120 may also determine one or more frequency bins that correspond to the Bluetooth control channels. For example, the control channel identification unit 120 may determine that only a subset of the frequency bins generated at the output of the FFT unit 114 correspond to the Bluetooth control channels and, therefore, that only the identified subset of frequency bins should be analyzed. In some implementations, the control channel identification unit 120 may identify the Bluetooth control channel once (e.g., at startup), and may then use these identified Bluetooth control channels until the Bluetooth device is powered down or reset. In other implementations, the control channel identification unit 120 may recalculate the Bluetooth control channels at periodic intervals. The flow continues at block 208.

At block 208, the RF signal samples that are associated with the identified Bluetooth control channels are stored. For example, the RF signal samples (generated by the ADC 112) that are associated with the Bluetooth control channels may be stored in the memory unit 116 of FIG. 1. As described above, the control channel identification unit 120 can identify the Bluetooth control channels that are to be analyzed. The control channel identification unit 120 can cause the Bluetooth device to store the RF signal samples associated with the Bluetooth control channels in the memory unit 116. Storing the RF signal samples can enable multiple Bluetooth control packets to be detected on corresponding multiple Bluetooth control channels. Storing the RF signal samples can also enable the Bluetooth processing units (e.g., the packet processing units 126, the correlators 128, etc.) to process the RF signal samples in accordance with at least one of the Bluetooth control channels on which Bluetooth control packets were detected (as will be further described in FIGS. 3-4). In one implementation, the memory unit 116 can be a circular buffer. In one implementation, the size of the memory unit 116 can be determined based, at least in part, on the length of a Bluetooth control packet preamble. For example, the size of the memory unit 116 may be selected so that the memory unit 116 can store at least 90 microseconds of the received RF signal with an ADC sampling rate of 40 MHz or 80 MHz. It is noted, however, that in other examples the size of the memory unit 116 can be selected based on other criteria and may be other suitable sizes. The flow continues at block 210.

At block 210, a loop begins for each of the Bluetooth control channels. For example, the Bluetooth detection unit 118 can initiate a loop to execute operations described below in blocks 212-222 to determine whether a Bluetooth control packet was received on any of the Bluetooth control channels. The flow continues at block 212.

Figure 5:
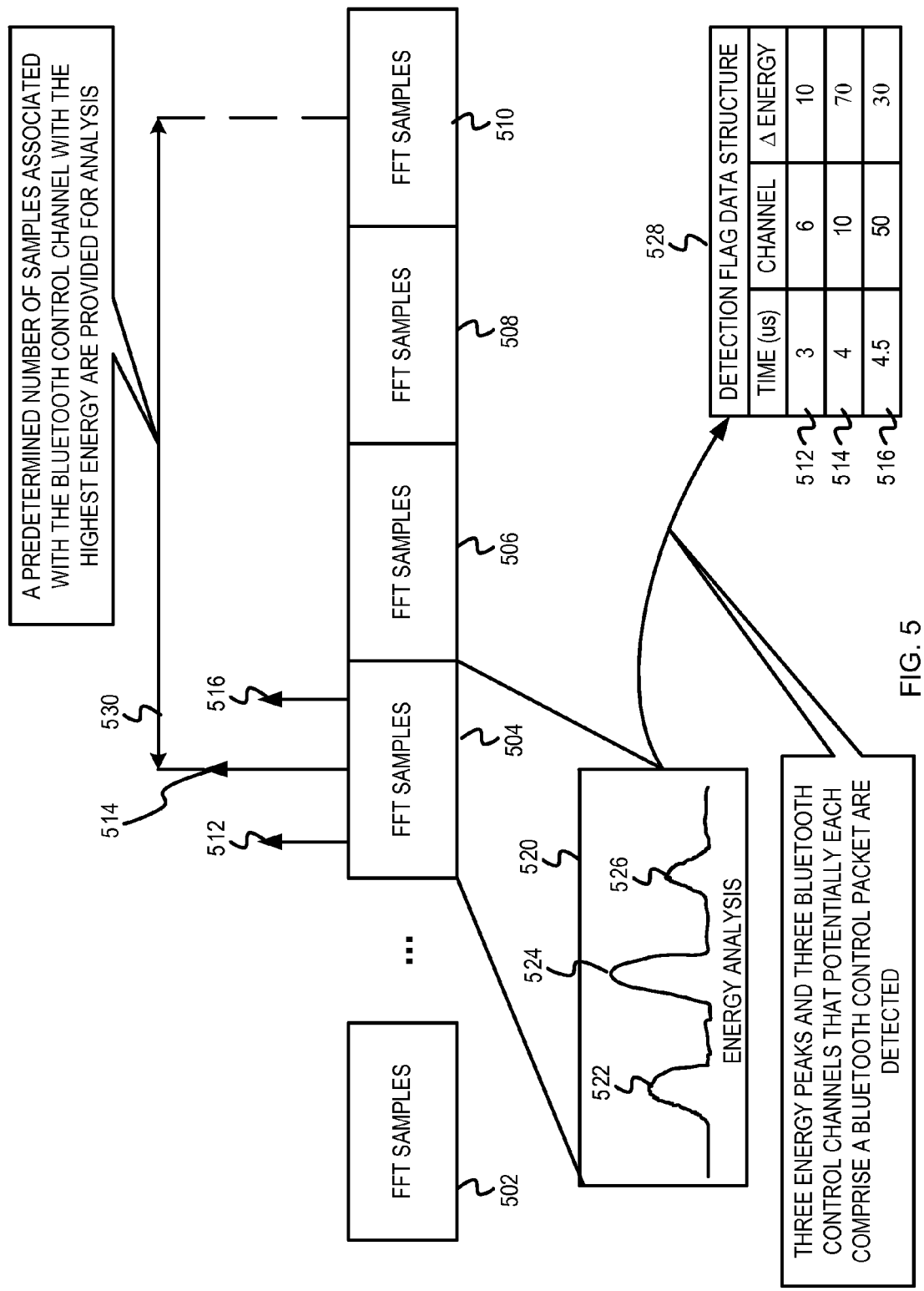
FIG. 5 is an example conceptual diagram illustrating operations for selecting the Bluetooth control channel that comprises the Bluetooth control packet.

At block 212, a current energy associated with the Bluetooth control channel is calculated based on the RF signal frequency samples associated with the Bluetooth control channel. For example, the energy analysis unit 122 can calculate the current energy associated with the Bluetooth control channel. In other words, the energy analysis unit 122 can calculated the current energy associated with the Bluetooth control channel from the RF signal frequency samples within one or more frequency bins that correspond to the Bluetooth control channel. The current energy associated with the Bluetooth control channel can be calculated as a sum of the squares of each of the RF signal frequency samples associated with the Bluetooth control channel. FIG. 5 depicts FFT sample blocks 502, 504, 506, 508, and 510 generated by the FFT unit 114 during consecutive time intervals. As described above, each FFT sample block 502, 504, 506, 508, and 510 comprises a plurality of frequency bins that comprise RF signal frequency samples. Considering the FFT sample block 510, the energy analysis unit 122 can determine the current energy associated with the Bluetooth control channel based on the RF signal frequency samples within the frequency bins (of the FFT sample block 510) that correspond to the Bluetooth control channel. It is noted that in other implementations, other suitable measures of signal strength (e.g., power) associated with the Bluetooth control channel can be determined to analyze the Bluetooth control channels. The flow continues at block 214.

At block 214, an average energy associated with the Bluetooth control channel is calculated across a predetermined time interval. For example, the energy analysis unit 122 can calculate the average energy associated with the Bluetooth control channel from the previously received RF signal frequency samples that correspond to the Bluetooth control channel. In one implementation, the energy analysis unit 122 can store N previously calculated (e.g., during N preceding time intervals) values of the energy associated with the Bluetooth control channel. The energy analysis unit 122 can then calculate an average of the N previously calculated values of the energy associated with the Bluetooth control channel to yield the average energy associated with the Bluetooth control channel. For example, the energy analysis unit 122 may calculate the energy associated with the Bluetooth control channel every 8 microseconds. Thus, to determine the average energy across a 64 microsecond predetermined time interval, the energy analysis unit 122 may use the last 8 calculated energy values associated with the Bluetooth control channel. Referring to the FFT sample block 510 of FIG. 5, the energy analysis unit 122 can determine the average energy associated with the Bluetooth control channel based on the RF signal frequency samples (associated with the Bluetooth control channel) within the frequency bins of the previous FFT sample blocks 502, 504, 506, and 508. In other words, the energy analysis unit 122 may determine that the average energy associated with the Bluetooth control channel should be determined across N previous FFT sample blocks. Thus, when the FFT sample block 510 is the current FFT sample block, the energy analysis unit 122 can calculate an average of the energy values (associated with the Bluetooth control channel) previously calculated for the FFT sample blocks 502, 504, 506, and 508 to determine the average energy associated with the Bluetooth control channel. The number of FFT sample blocks (and/or the predetermined time interval) across which the average energy is calculated can be configurable. It is noted that in other implementations, other suitable measure of signal strength (e.g., average power) associated with the Bluetooth control channel can be determined to analyze the Bluetooth control channels. The flow continues at block 216 in FIG. 3.

At block 216 in FIG. 3, it is determined whether the difference between the current energy associated with the Bluetooth control channel and the average energy associated with the Bluetooth control channel is greater than an energy jump threshold. For example, the control packet detection unit 124 can determine whether the difference between the current energy associated with the Bluetooth control channel (determined at block 212) and the average energy associated with the Bluetooth control channel (determined at block 214) is greater than the energy jump threshold. The current energy associated with the Bluetooth control channel being greater than the average energy associated with the Bluetooth control channel can indicate that a Bluetooth control packet was potentially detected on the Bluetooth control channel. In other words, if the energy associated with the RF signal frequency samples corresponding to the Bluetooth control channel during a current time interval is greater than the average energy associated with the RF signal frequency samples corresponding to the Bluetooth control channel during a previous predetermined time interval (e.g., across a previous 90 microsecond time interval), then the control packet detection unit 124 determines that a Bluetooth control packet was potentially detected. Since some variations are possible, by determining whether the current energy associated with the Bluetooth control channel is greater than the average energy associated with the Bluetooth control channel by at least the energy jump threshold, the probability of false positive packet detection can be minimized. It is noted that in other implementations, it may be determined whether the ratio of the current energy associated with the Bluetooth control channel and the average energy associated with the Bluetooth control channel is greater than the energy jump threshold. In yet another implementation, other suitable measures of signal strength can be compared against the corresponding threshold to determine whether a Bluetooth control packet was potentially detected. For example, it may be determined whether the current signal power associated with the Bluetooth control channel is greater than the average signal power associated with the Bluetooth control channel by a predetermined power jump threshold. If it is determined that the difference between the current energy associated with the Bluetooth control channel and the average energy associated with the Bluetooth control channel is greater than the energy jump threshold, the flow continues at block 218 where the control packet detection unit 124 determines whether the detected packet is a Bluetooth control packet. Otherwise, the flow continues at block 228.

At block 218, it is determined whether a narrowband signal was detected on the Bluetooth control channel. For example, the control packet detection unit 124 can determine whether a signal that comprises a potential Bluetooth control packet detected at block 216 is a narrowband signal. The Bluetooth communication protocol is a narrowband communication protocol that utilizes multiple narrowband (e.g., 1 MHz) channels for communication. Therefore, the control packet detection unit 124 attempts to determine whether the packet detected on the Bluetooth control channel at block 216 was received as part of a narrowband signal in order to help ensure that a Bluetooth control packet was detected on the Bluetooth control channel. In some implementations, to detect a narrowband signal, the control packet detection unit 124 can compare the energy associated with a preceding and a subsequent contiguous Bluetooth communication channel against a narrowband energy threshold. For example, if the control packet detection unit 124 determines (at block 216) that the current energy associated with Bluetooth channel 50 is greater than the average energy associated with the Bluetooth channel 50 by the energy jump threshold, the control packet detection unit 124 can determine whether the energy jump was detected only on the Bluetooth channel 50. The control packet detection unit 124 can determine whether the current energy associated with the adjacent Bluetooth channels 49 and 51 is less than the narrowband energy threshold. In one example, if the narrowband energy threshold is 8 dB, the control packet detection unit 124 can determine whether the current energy associated with the adjacent Bluetooth channels 49 and 51 is less than 8 dB (assuming that the energy jump associated with the Bluetooth channel 50 is greater than 8 dB). If the energy associated with the adjacent Bluetooth channels is less than the narrowband energy threshold, the control packet detection unit 124 can determine that a narrowband signal comprising a Bluetooth control packet was detected on the Bluetooth control channel. If the energy associated with the adjacent Bluetooth channels is greater than the narrowband energy threshold, the control packet detection unit 124 can determine that a wideband signal (or another signal that does not comprise a Bluetooth control packet) was detected. It is noted, however, that in other implementations other techniques can be utilized to determine whether a narrowband signal is detected on the Bluetooth control channel. If it is determined that the Bluetooth control channel comprises a narrowband signal, the flow continues at block 220. Otherwise, the flow continues at block 228.

At block 220, it is determined that a Bluetooth control packet was received on the Bluetooth control channel. The flow 200 moves from block 218 to block 220 if the energy analysis unit 122 determines that the current energy associated with the Bluetooth control channel is greater than the average energy associated with the Bluetooth control channel by at least the predetermined energy jump threshold and that a narrowband signal was detected on the Bluetooth control channel. In some implementations, in response to determining that a Bluetooth control packet was received on the Bluetooth control channel, the control packet detection unit 124 can generate a detection flag to identify this Bluetooth control channel. FIG. 5 illustrates an example format of a detection flag data structure 528 comprising detection flags. The Bluetooth detection unit 118 receives and analyses the FFT sample block 504 to determine whether one or more Bluetooth control packets were received. The control packet detection unit 124 detects three Bluetooth control packets on corresponding three Bluetooth control channels (as described above in blocks 216-220). An energy analysis graph 520 illustrates three narrowband energy peaks 522, 524, and 526.

Consequently, in the example shown in FIG. 5, the control packet detection unit 124 generates three detection flags to indicate the three Bluetooth control channels on which the corresponding three Bluetooth control packets were detected. As shown, detection flag 512 corresponds to the narrowband energy peak 522, detection flag 514 corresponds to the narrowband energy peak 524, and detection flag 516 corresponds to the narrowband energy peak 526. The control packet detection unit 124 can also populate the detection flag data structure 528 to store the detection flags 512, 514, and 516. The detection flag data structure 528 can comprise information such as a time instant at which the Bluetooth control packet was detected on the Bluetooth control channel, a channel identifier associated with the Bluetooth control channel, and an energy jump detected on the Bluetooth control channel. In one example, the control packet detection unit 124 can determine the starting time instant at which the Bluetooth control packet was detected on the Bluetooth control channel as the time instant at which the control packet detection unit 124 determined that the difference between the current energy associated with the Bluetooth control channel and the average energy associated with the Bluetooth control channel was greater than the energy jump threshold. The energy jump stored in the detection flag data structure 528 may be the difference between the current energy associated with the Bluetooth control channel and the average energy associated with the Bluetooth control channel determined at block 216. In FIG. 5, the detection flag 512 indicates that a Bluetooth control packet was detected at t=3 microseconds on Bluetooth channel 3 and is associated with an energy jump of 10 dB. The detection flag 514 indicates that a Bluetooth control packet was detected at t=4 microseconds on Bluetooth channel 10 and is associated with an energy jump of 70 dB. Finally, the detection flag 516 indicates that the Bluetooth control packet was detected at t=4.5 microseconds on Bluetooth channel 50 and is associated with an energy jump of 30 dB.

In some implementations, each of the detection flags 512, 514, and 516 serve to mark the beginning of a corresponding detected Bluetooth control packet. For example, based on knowledge that the detection flag 512 was generated at t=2 microseconds, a predetermined number of RF signal samples (beginning at the RF signal sample corresponding to t=2 microseconds) can be accessed from the memory unit 116 for subsequent processing, as will be described below in FIG. 4. Storing an indication of the Bluetooth control channels on which the Bluetooth control packets were detected and storing the RF signal samples in the memory unit 116 can preclude the need for correlating/processing the RF signal samples as soon as a Bluetooth control packet is detected on one of the Bluetooth control channels. Instead, as will be further described below in FIG. 3, the Bluetooth detection unit 118 can continue to attempt to identify other Bluetooth control channels that could comprise Bluetooth control packets and can then select a most appropriate Bluetooth control channel for subsequent processing. The flow continues at block 222.

At block 228, it is determined that a Bluetooth control packet was not received on the Bluetooth control channel. The flow 200 moves from block 216 to block 228 if the control packet detection unit 124 determines that the difference between the current energy associated with the Bluetooth control channel and the average energy associated with the Bluetooth control channel is less than the energy jump threshold. The flow 200 also moves from block 218 to block 228 if the control packet detection unit 124 determines that the Bluetooth control channel does not comprise a narrowband signal. From block 228, the flow continues at block 222.

At block 222, it is determined whether additional Bluetooth control channels are to be analyzed. For example, the Bluetooth detection unit 118 can determine whether additional Bluetooth control channels are to be analyzed. If it is determined that additional Bluetooth control channels are to be analyzed, the flow loops back to block 210 in FIG. 2, where the next Bluetooth control channel is identified and operations described with reference to blocks 212-222 are executed for the next Bluetooth control channel. Otherwise, the flow continues at block 224.

At block 224, it is determined whether Bluetooth control packets were detected on more than one Bluetooth control channel. For example, the control packet detection unit 124 can determine whether Bluetooth control packets were detected on more than one Bluetooth control channel. Referring to the example shown in FIG. 5, the detection flag data structure 528 indicates that in the analysis of the FFT sample block 504, Bluetooth control packets were detected on three different Bluetooth control channels. As will be described below in block 226, the control packet detection unit 124 can select one of the three identified Bluetooth control channels for subsequent analysis. If it is determined that Bluetooth control packets were detected on more than one Bluetooth control channel, the flow continues at block 226. If a Bluetooth control packet was detected on only one Bluetooth control channel, the detected Bluetooth control channel is identified as a "target Bluetooth control channel" and the flow continues at block 230 in FIG. 4.

At block 226, the Bluetooth control channel associated with highest energy is selected as the target Bluetooth control channel. The flow 200 moves from block 224 to block 226 if the control packet detection unit 124 determines that Bluetooth control packets were detected on more than one Bluetooth control channel. Referring to FIG. 5, the control packet detection unit 124 determines that Bluetooth control packets were detected at three different Bluetooth control channels identified by the detection flags 512, 514, and 516. In one implementation, the control packet detection unit 124 can select the Bluetooth control channel associated with the highest energy jump for subsequent processing (e.g., for correlation) of the RF signal samples. Referring to the example shown in FIG. 5, the control packet detection unit 124 determines that Bluetooth channel 10 (corresponding to the detection flag 516 and the energy peak 524) is associated with the highest energy jump. Consequently, the control packet detection unit 124 can indicate that the RF signal samples should be processed in accordance with Bluetooth channel 10. In other implementations, however, the control packet detection unit 124 can select any suitable number of target Bluetooth control channels for subsequent processing of the RF signal samples. For example, the number of selected target Bluetooth control channels may be depend on the correlators 128 associated with (or available to) the Bluetooth device. From block 226 in FIG. 3, the flow now continues at block 230 in FIG. 4.

Figure 6:
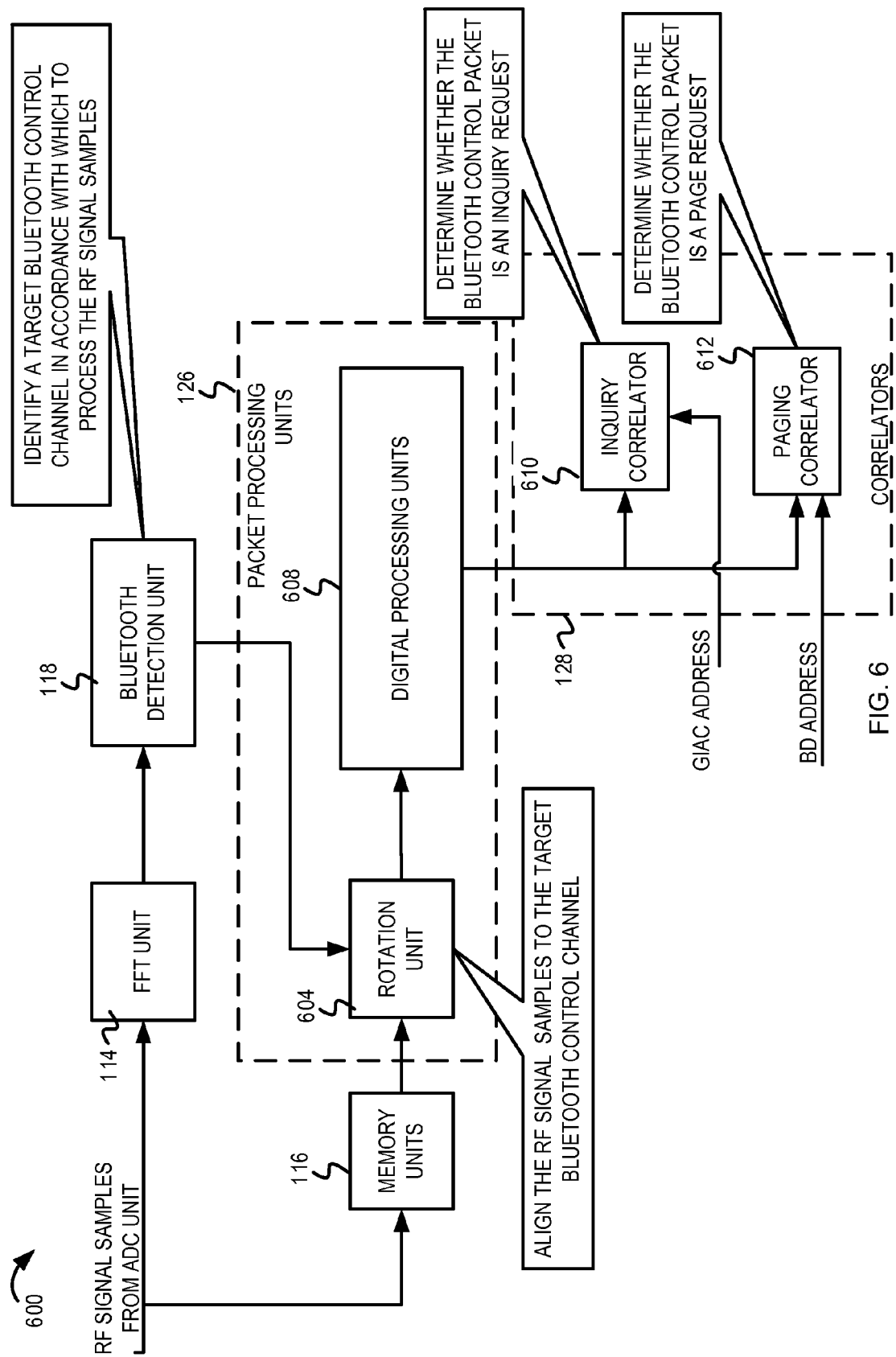
FIG. 6 is an example block diagram illustrating operations for detecting and processing the Bluetooth control packet.

At block 230 in FIG. 4, at least a subset of the stored RF signal samples are processed based, at least in part, on the target Bluetooth control channel. FIG. 6 is an example block diagram illustrating operations for detecting and processing the Bluetooth control packet. FIG. 6 depicts the FFT unit 114 coupled with the Bluetooth detection unit 118. The Bluetooth detection unit 118 and the memory unit 116 are coupled with a rotation unit 604. The rotation unit 604 is coupled with one or more digital processing units 608. The output of the digital processing units 608 is provided to an inquiry correlator 610 and a paging correlator 612. As described above, the ADC 112 generates RF signal samples that are provided to the FFT unit 114 and are stored in the memory unit 116. The FFT unit 114 generates the RF signal frequency samples from the time domain representation of the RF signal samples. As described above with reference to blocks 202-228 of FIGS. 2-3, the Bluetooth detection unit 118 identifies the target Bluetooth control channel and the corresponding detection flag in accordance with which to process the RF signal samples. For example, in FIG. 5, the Bluetooth detection unit 118 can indicate that the information associated with the detection flag 514 should be used for subsequent analysis of the RF signal samples.

In one implementation, the Bluetooth detection unit 118 (e.g., the control packet detection unit 124) can determine whether a sufficient number of RF signal samples are available in the memory unit 116. For example, referring to FIG. 5, the Bluetooth detection unit 118 can, based on the detection flag 514, determine that the Bluetooth control packet was detected on the Bluetooth channel 10 at t=4 microseconds. The Bluetooth detection unit 118 can also determine that the FFT sample blocks 506, 508, and 510 were received and, therefore, that a predetermined number 530 of RF signal samples are available in the memory unit 116. In one example, the predetermined number 530 of RF signal samples can comprise the samples generated from 90 microseconds of the received RF signal beginning at the time instant at which the Bluetooth control packet was detected (i.e., t=4 microseconds). The Bluetooth detection unit 118 can provide an indication (to the packet processing units 126) to access the predetermined number 530 of RF signal samples from the memory unit 116. For example, the Bluetooth detection unit 118 can provide an indication of the timing information (e.g., a time instant) associated with detecting the Bluetooth control packet on the Bluetooth control channel. The Bluetooth detection unit 118 can also identify (to the packet processing units 126) the Bluetooth control channel (e.g., by providing a channel number, a channel frequency, etc.) at which the Bluetooth control packet was detected.

Referring to FIG. 6, the Bluetooth detection unit 118 can provide an indication (including the timing information, the channel number, etc.) to the rotation unit 604 (of the packet processing unit 126) to enable the rotation unit 604 to access the predetermined number 530 of RF signal samples from the memory unit 116. The rotation unit 604 can access the predetermined number 530 of RF signal samples based on the received timing information and can align (or rotate) the RF signal samples to the target Bluetooth control channel. Referring to example shown in FIG. 5, the Bluetooth detection unit 118 can indicate that RF signal samples beginning at t=4 microseconds in FFT sample block 504 should be analyzed in accordance with Bluetooth channel +10. The rotation unit 604 can read the corresponding RF signal samples 530 from the memory unit 116 based on timing information (e.g., beginning at t=4 microseconds) associated with the target Bluetooth control channel. The rotation unit 604 can rotate the RF signal samples 530 by 10 MHz and can then provide the rotated RF signal samples 530 to the digital processing units 608. The digital processing units 608 can comprise a down-sampler, filter stages, mixers, amplifiers, and other suitable processing units. In one example, if the ADC 112 generated the RF signal samples at a sampling rate of 40 MHz, the digital processing units 608 can comprise a first filter stage to filter the 40 MHz RF signal samples, a down-sampler that down samples the 40 MHz RF signal samples by a factor of 5 to yield 8 MHz RF signal samples, a DC filter, a demodulator, a Cartesian to polar converter, and a mixer. As another example, if the ADC 112 generated the RF signal samples at a sampling rate of 80 MHz, the digital processing units 608 can comprise a first filter stage to filter the 80 MHz RF signal samples, a down-sampler that down samples the 80 MHz RF signal samples by a factor of 5 to yield 16 MHz RF signal samples, a second filter stage, a second down-sampler that down samples the 16 MHz RF signal samples by a factor of 2 to yield 8 MHz RF signal samples, a DC filter, a demodulator, a Cartesian to polar converter, and a mixer. The output of the digital processing units can then be provided to the correlators 128 as will be described below in blocks 232 and 236. The flow continues at block 232.

At block 232, it is determined whether the Bluetooth control packet is an inquiry request intended for the Bluetooth device. For example, the correlators 128 can determine whether the Bluetooth control packet is an inquiry request intended for the Bluetooth device. In one example, the correlators 128 can comprise an inquiry correlator (e.g., the inquiry correlator 610 of FIG. 6) that correlates the predetermined number 530 of the RF signal samples with a general inquiry access code (GIAC) address. A successful correlation between the RF signal samples and the GIAC address can indicate that the received RF signal comprises a Bluetooth inquiry request intended for the Bluetooth device. A failed correlation between the RF signal samples and the GIAC address can indicate that the received RF signal does not comprise a Bluetooth inquiry request. A failed correlation between the RF signal samples and the GIAC address can also indicate that the received RF signal comprises a Bluetooth control packet that is not intended for the Bluetooth device. If it is determined that the Bluetooth control packet is an inquiry request intended for the Bluetooth device, the flow continues at block 234. Otherwise, the flow continues at block 236.

At block 234, an inquiry response corresponding to the received inquiry request is generated and transmitted. For example, in response to determining that the Bluetooth control packet is an inquiry request intended for the Bluetooth device, the inquiry correlator 610 can generate a notification to cause a response generation unit (not shown in the Figures) of the Bluetooth device to generate the corresponding inquiry response. In one implementation, the notification can be an interrupt (e.g., a hardware interrupt or a software interrupt) that indicates that an inquiry request intended for the Bluetooth device was detected and that a corresponding inquiry response should be generated. In some examples, the notification can also indicate the time instant at which the inquiry request was detected, a Bluetooth control channel on which the inquiry request was detected, and/or other information associated with the Bluetooth control channel on which the inquiry request was detected (e.g., a frequency offset associated with the Bluetooth control channel). In some implementations, the response generation unit can access a previously stored inquiry response message. The response generation unit can identify a Bluetooth control channel on which to transmit the inquiry response message and can transmit the inquiry response message. From block 234, the flow ends.

At block 236, it is determined whether the Bluetooth control packet is a page request intended for the Bluetooth device. For example, the correlators 128 can determine whether the Bluetooth control packet is a page request intended for the Bluetooth device. In one example, the correlators 128 can comprise a paging correlator (e.g., the paging correlator 612 of FIG. 6) that correlates the predetermined number 530 of the RF signal samples with the Bluetooth device (BD) address. A successful correlation between the RF signal samples and the BD address can indicate that the received RF signal comprises a Bluetooth page request intended for the Bluetooth device. A failed correlation between the RF signal samples and the BD address can indicate that the received RF signal does not comprise a Bluetooth page request intended for the Bluetooth device. If it is determined that the Bluetooth control packet is a page request intended for the Bluetooth device, the flow continues at block 238. Otherwise, the flow continues at block 240.

At block 238, a page response corresponding to the received page request is generated and transmitted. For example, in response to determining that the Bluetooth control packet is a page request intended for the Bluetooth device, the paging correlator 612 can generate a notification to cause the response generation unit of the Bluetooth device to generate the corresponding page response. In one implementation, the response generation unit can access a previously stored page response that was generated based on the BD address. The response generation unit can identify a Bluetooth control channel on which to transmit the page response and can transmit the page response. From block 238, the flow ends.

At block 240, it is determined to not respond to the received Bluetooth control packet. The flow 200 moves from block 236 to block 240 if the inquiry correlator 610 determines that the Bluetooth control packet detected on the target Bluetooth control channel was not an inquiry request intended for the Bluetooth device and if the paging correlator 612 determines that the Bluetooth control packet detected on the target Bluetooth control channel was not a paging request intended for the Bluetooth device. In other words, the flow 200 moves from block 236 to block 240 if the inquiry correlator 610 determines a failed correlation between the RF signal samples and the GIAC address and if the paging correlator 612 determines a failed correlation between the RF signal samples and the BD address. From block 240, the flow ends.

It should be understood that FIGS. 1-8 are examples meant to aid in understanding embodiments and should not be used to limit embodiments or limit scope of the claims. Embodiments may comprise additional circuit components, different circuit components, and/or may perform additional operations, fewer operations, operations in a different order, operations in parallel, and some operations differently. For example, it is noted that in some implementations, the Bluetooth device can transmit the inquiry response (or the page response) as soon as the inquiry request (or the paging request) is detected. For example, the Bluetooth device can cause (or request) the collocated WLAN device to relinquish control of the communication medium (or implement other coexistence techniques). In other implementations, the Bluetooth device can store the information associated with the target Bluetooth control channel (determined at blocks 224 and 226). For example, the Bluetooth device may store the detection flag associated with the target Bluetooth control channel and may discard the other detection flags. The Bluetooth device may transmit the inquiry/page response on an appropriate Bluetooth control channel when the Bluetooth device gains control of the communication medium. In other implementations, the Bluetooth device may ignore the notification identifying the target Bluetooth control channel and may continue to execute operations for background scanning for Bluetooth control packets until the Bluetooth device gains control of the communication medium.

Although FIGS. 1-6 depict the Bluetooth device comprising one set of correlators (e.g., the inquiry correlator 610 and the paging correlator 612), embodiments are not so limited. In some implementations, the Bluetooth device can comprise any suitable number of correlators. The number of correlators and the processing speed of the correlators can influence the number of Bluetooth control packets that can be processed per FFT sample block. In one example, as described above in FIGS. 4-6, the Bluetooth device comprises one inquiry correlator 610 and one paging correlator 612. Therefore, if multiple detection flags (corresponding to Bluetooth packets detected on multiple Bluetooth control channels) are generated for one FFT sample block (as depicted in FIG. 5), the Bluetooth detection unit 118 selects one target Bluetooth control channel associated with the highest energy jump. In other examples, however, the number of correlators associated with the Bluetooth device and/or the processing speed of the correlators can be increased to enable the Bluetooth device to analyze more than one Bluetooth control packet detected within an FFT sample block. Moreover, although FIG. 4 depicts the operations of blocks 232 and 236 being executed successively, embodiments are not so limited. In other embodiments, the operations of blocks 232 and 236 can be executed in parallel. In other words, the predetermined number 530 of RF signal samples can be simultaneously provided to the inquiry correlator 610 and the paging correlator 612. The inquiry correlator 610 and the paging correlator 612 can correlate the predetermined number 530 of RF signal samples with the GIAC address and the BD address, respectively, and generate either a "correlation successful" or a "correlation failed" notification.

Although the Figures describe the energy analysis unit 122 calculating the average energy associated with each Bluetooth control channel based on N previous values of the energy calculated from N previous FFT sample blocks, embodiments are not so limited. In other embodiments, the energy analysis unit can estimate the average energy based on determining an infinite impulse response (IIR) associated with the FFT sample blocks. The energy analysis unit 122 may determine the energy of the current FFT sample block (e.g., the FFT sample block 510) as the current energy and may determine the average energy as an average of the energy associated with N previous FFT sample blocks (e.g., the FFT sample block 502, 504, 506, and 508). In other embodiments, other suitable techniques for calculating the average energy can be employed.

Lastly, the operations for background scanning for Bluetooth control packets can be executed irrespective of whether the Bluetooth device is configured in an active inquiry/paging scan mode or a passive inquiry/paging scan mode. The Bluetooth detection unit 118 can maintain a mode variable that indicates whether the Bluetooth device is configured to operate in the active inquiry/paging scan mode or the passive inquiry/paging scan mode. For example, assigning the mode variable a value of "0" can indicate that the Bluetooth device is configured to operate in the active inquiry/paging scan mode and assigning the mode variable a value of "1" can indicate that the Bluetooth device is configured to operate in the passive inquiry/paging scan mode. When configured in the active inquiry/paging scan mode, the Bluetooth device and the collocated WLAN device can periodically gain control of the communication medium. The Bluetooth detection unit 118 can execute operations described with reference to FIGS. 1-6 each time the WLAN device gains control of the communication medium. The Bluetooth detection unit 118 may also execute operations described with reference to FIGS. 1-6 when the Bluetooth device gains control of the communication medium. When configured in the passive inquiry/paging scan mode, the Bluetooth detection unit 118 can continuously execute operations described with reference to FIGS. 1-6 to detect potential Bluetooth control packets intended for the Bluetooth device even while the collocated WLAN device is receiving WLAN packets.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). A machine-readable medium may be a machine-readable storage medium, or a machine-readable signal medium. A machine-readable storage medium may include, for example, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of tangible medium suitable for storing electronic instructions. A machine-readable signal medium may include a propagated data signal with computer readable program code embodied therein, for example, an electrical, optical, acoustical, or other form of propagated signal (e.g., carrier waves, infrared signals, digital signals, etc.). Program code embodied on a machine-readable signal medium may be transmitted using any suitable medium, including, but not limited to, wireline, wireless, optical fiber cable, RF, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 7:
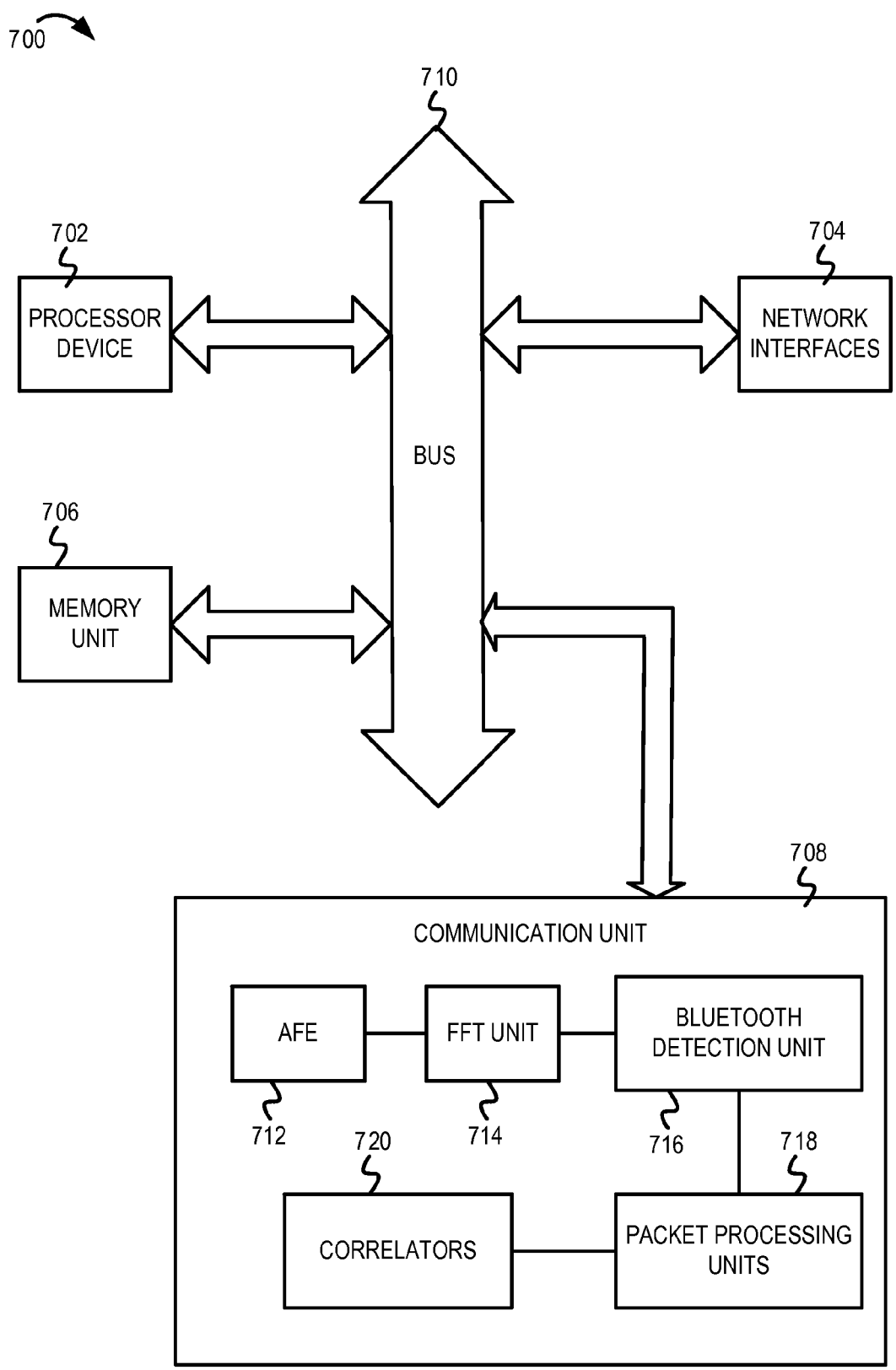
FIG. 7 is a block diagram of one embodiment of a communication device including a mechanism for concurrent background spectral scanning for Bluetooth packets while receiving WLAN packets.

FIG. 7 is a block diagram of one embodiment of an electronic device 700 including a mechanism for concurrent background spectral scanning for Bluetooth packets while receiving WLAN packets. In some implementations, the electronic device 700 may be one of a personal computer (PC), a notebook computer, a tablet computer, a netbook, a mobile phone, a gaming console, a mobile phone, a personal digital assistant (PDA), a smart appliance, or other electronic devices comprising a collocated WLAN device and a Bluetooth device. In some implementations, the Bluetooth device and the WLAN device can be embodied on distinct integrated circuits (e.g., distinct Bluetooth and WLAN chips) on a common circuit board (or on separate circuit boards in close proximity). In other implementations, the Bluetooth device and the WLAN device can be embodied on a single integrated circuit (e.g., a system on a chip (SoC)). The Bluetooth device and the WLAN device can share one or more processing components (e.g., receiver antenna, analog front end processing units, etc.).

The electronic device 700 includes a processor unit 702 (possibly including multiple processors, multiple cores, multiple nodes, and/or implementing multi-threading, etc.). The electronic device 700 includes a memory unit 706. The memory unit 706 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 700 also includes a bus 710 (e.g., PCI, ISA, PCI-Express, HyperTransport®, InfiniBand®, NuBus, AHB, AXI, etc.), and network interfaces 704 that include at least one of a wireless network interface (e.g., a WLAN interface, a Bluetooth® interface, a WiMAX interface, a ZigBee® interface, a Wireless USB interface, etc.) and a wired network interface (e.g., an ATM interface, an Ethernet interface, a Frame Relay interface, SONET interface, etc.).

The electronic device 700 also comprises a communication unit 708. The communication unit 708 comprises an AFE 712, a FFT unit 714, a Bluetooth detection unit 716, a packet processing unit 718, and correlators 720. The communication unit 708 can comprise a Bluetooth device and a collocated WLAN device. In one implementation, the Bluetooth device and the collocated WLAN device can share one or more of the AFE 712, the FFT unit 714, the Bluetooth detection unit 716, the packet processing unit 718, and the correlators 720. In another implementation, one or more of the AFE 712, the FFT unit 714, the Bluetooth detection unit 716, the packet processing unit 718, and the correlators 720 can be implemented separately by the Bluetooth device and/or the collocated WLAN device. As described above with reference to FIGS. 1-6, the Bluetooth detection unit 716 can implement functionality to detect Bluetooth control channels on which Bluetooth control packets were received, while the collocated WLAN device is receiving a WLAN packet. Any one of these functionalities may be partially (or entirely) implemented in hardware and/or on the processor unit 702. For example, the functionality may be implemented with an application specific integrated circuit, in logic implemented in the processor unit 702, in a co-processor on a peripheral device or card, etc. Further, realizations may include fewer or additional components not illustrated in FIG. 7 (e.g., video cards, audio cards, additional network interfaces, peripheral devices, etc.). The processor unit 702, the memory unit 706, and the network interfaces 706 are coupled to the bus 710. Although illustrated as being coupled to the bus 710, the memory unit 706 may be coupled to the processor unit 702.

While the embodiments are described with reference to various implementations and exploitations, it will be understood that these embodiments are illustrative and that the scope of the inventive subject matter is not limited to them. In general, techniques for concurrent background spectral scanning for Bluetooth packets while receiving WLAN packets as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
   determining a plurality of frequency domain samples of a radio frequency (RF) signal received at a first communication unit of a wireless communication device, wherein the first communication unit implements a first communication protocol;
   identifying a subset of the frequency domain samples of the RF signal that correspond to a control channel of a second communication unit of the wireless communication device based, at least in part, on an address of the second communication unit and a communication channel of the first communication unit on which the RF signal is received, wherein the second communication unit implements a second communication protocol and the communication channel of the first communication unit includes at least the control channel;
   determining an energy measurement associated with the control channel based, at least in part, on the subset of the frequency domain samples of the RF signal;
   determining whether the control channel includes a narrowband signal based, at least in part, on a narrowband energy threshold; and
   determining whether the control channel includes a control packet associated with the second communication unit based, at least in part, on comparing the energy measurement associated with the control channel against an energy jump threshold and on whether the control channel includes a narrowband signal.

2. The method of claim 1, wherein said determining the energy measurement associated with the control channel comprises:
   determining a current energy associated with the control channel based, at least in part, on the subset of the frequency domain samples of the RF signal that correspond to the control channel;
   determining an average energy associated with the control channel across a predetermined time interval; and
   determining whether a difference between the current energy and the average energy is greater than the energy jump threshold.

3. The method of claim 2, wherein said determining whether the control channel includes a control packet associated with the second communication unit further comprises:
   determining whether the control channel includes a narrowband signal in response to determining that the difference between the current energy associated with the control channel and the average energy associated with the control channel is greater than the energy jump threshold;
   determining that the control channel includes a control packet associated with the second communication unit in response to determining that the difference between the current energy and the average energy is greater than the energy jump threshold and in response to determining that the control channel includes a narrowband signal; and
   determining that the control channel does not include a control packet associated with the second communication unit in response to determining that the difference between the current energy and the average energy is less than the energy jump threshold or in response to determining that the control channel does not include a narrowband signal.

4. The method of claim 1, wherein said determining whether the control channel includes a narrowband signal further comprises:
   identifying a first communication channel and a second communication channel of the second communication unit that are adjacent to the control channel of the second communication unit;
   determining an energy associated with the first communication channel and an energy associated with the second communication channel;
   determining whether the energy associated with the first communication channel and the energy associated with the second communication channel are less than the narrowband energy threshold; and
   determining that the control channel includes a narrowband signal in response to determining that the energy associated with the first communication channel and the energy associated with the second communication channel are less than the narrowband energy threshold.

5. The method of claim 1,
   wherein said determining the energy measurement associated with the control channel comprises:
      determining a current energy associated with the control channel based, at least in part, on the subset of the frequency domain samples of the RF signal that correspond to the control channel;
      determining an average energy associated with the control channel across a predetermined time interval; and
      determining whether a ratio of the current energy and the average energy is greater than the energy jump threshold.

6. The method of claim 5, wherein said determining that the control channel includes a control packet associated with the second communication unit further comprises:
   determining whether the control channel includes a narrowband signal in response to determining that the ratio of the current energy and the average energy is greater than the energy jump threshold; and
   determining that the control channel includes a control packet in response to determining that the ratio of the current energy and the average energy is greater than the energy jump threshold and in response to determining that the control channel includes a narrowband signal.

7. The method of claim 1, wherein
   the first communication unit is configured to implement a wireless local area network (WLAN) protocol,
   the second communication unit is configured to implement a Bluetooth protocol, and
   the control channel is used for communicating using the Bluetooth protocol.

8. The method of claim 1, further comprising:
   storing the subset of the frequency domain samples of the RF signal that correspond to the control channel.

9. The method of claim 1, further comprising:
generating, for the control channel of the second communication unit, an indication identifying the control channel in response to determining that the control channel includes a control packet associated with the second communication unit,
wherein said generating the indication identifying the control channel comprises:
storing at least one of a time instant at which the control packet was detected on the control channel, a channel identifier of the control channel on which the control packet was detected, and a difference between a current energy associated with the control channel and an average energy associated with the control channel.

10. The method of claim 1, further comprising:
identifying a plurality of control channels on which control packets were detected;
analyzing, for each of the plurality of control channels, a difference between a current energy associated with the control channel and an average energy associated with the control channel;
identifying a first control channel of the plurality of control channels that is associated with a highest difference between the current energy and the average energy; and
designating the first control channel as a target control channel to process a portion of the RF signal that corresponds to the target control channel.

11. The method of claim 10, further comprising:
reading, from a memory unit, a predetermined number of time domain samples of the RF signal based, at least in part, on a time instant at which a control packet was detected on the target control channel;
rotating the predetermined number of time domain samples based, at least in part, on a frequency associated with the target control channel; and
processing the predetermined number of time domain samples to determine whether the control packet detected on the target control channel is intended for the second communication unit.

12. The method of claim 1, wherein in response to determining that the control channel includes a control packet, the method further comprises:
correlating a predetermined number of time domain samples of the RF signal with a predetermined broadcast address of a network device class that includes the second communication unit;
in response to determining a successful correlation between the predetermined number of time domain samples and the predetermined broadcast address,
determining that the control channel includes a first type of control packet intended for the second communication unit; and
providing a response associated with the first type of control packet.

13. The method of claim 12, wherein in response to determining that the control channel includes the control packet, the method further comprises:
correlating the predetermined number of time domain samples with an address of the second communication unit;
in response to determining a successful correlation between the predetermined number of time domain samples and the address of the second communication unit,
determining that the control channel includes a second type of control packet intended for the second communication unit; and
providing a response associated with the second type of control packet.

14. The method of claim 13,
wherein the first communication unit is configured to implement a WLAN protocol and the second communication unit is configured to implement a Bluetooth protocol, and
wherein the predetermined broadcast address is a general inquiry access code (GIAC) address, the address of the second communication unit is a Bluetooth device (BD) address, the first type of control packet is an inquiry packet in accordance with the Bluetooth protocol, and the second type of control packet is a paging packet in accordance with the Bluetooth protocol.

15. A communication device comprising:
a first communication unit that implements a first communication protocol, the first communication unit comprising:
a fast Fourier transform (FFT) unit operable to generate a plurality of frequency domain samples of a radio frequency (RF) signal received at the first communication unit; and
a second communication unit that implements a second communication protocol, the second communication unit coupled with the first communication unit, the second communication unit comprising:
a detection unit operable to:
identify a subset of the frequency domain samples of the RF signal that correspond to a control channel of the second communication unit based, at least in part, on an address of the second communication unit and a communication channel of the first communication unit on which the RF signal is received, wherein the communication channel of the first communication unit includes at least the control channel;
determine an energy measurement associated with the control channel based, at least in part, on the subset of the frequency domain samples of the RF signal;
determine whether the control channel includes a narrowband signal based, at least in part, on a narrowband energy threshold; and
determine whether the control channel includes a control packet associated with the second communication unit based, at least in part, on comparing the energy measurement associated with the control channel against an energy jump threshold and on whether the control channel includes a narrowband signal.

16. The communication device of claim 15, wherein the detection unit is further operable to:
generate an indication identifying the control channel in response to determining that the control channel includes a control packet associated with the second communication unit,
wherein the detection unit operable to generate the indication identifying the control channel comprises the detection unit operable to:
store at least one of a time instant at which the control packet was detected on the control channel, a channel identifier of the control channel on which the control packet was detected, and a difference between a current energy associated with the control channel and an average energy associated with the control channel.

17. The communication device of claim 15, wherein the detection unit is further operable to:
  identify a plurality of control channels on which control packets were detected;
  analyze, for each of the plurality of control channels, a difference between a current energy associated with the control channel and an average energy associated with the control channel;
  identify a first control channel of the plurality of control channels that is associated with a highest difference between the current energy and the average energy; and
  designate the first control channel as a target control channel to process a subset of time domain samples of the RF signal that correspond to the target control channel.

18. A non-transitory machine-readable storage medium having instructions stored therein, which when executed by a processor unit causes the processor unit to perform operations that comprise:
  determining a plurality of frequency domain samples of a radio frequency (RF) signal received at a first communication unit of a wireless communication device, wherein the first communication unit implements a first communication protocol;
  identifying a subset of the frequency domain samples of the RF signal that correspond to a control channel of a second communication unit of the wireless communication device based, at least in part, on an address of the second communication unit and a communication channel of the first communication unit on which the RF signal is received, wherein the second communication unit implements a second communication protocol and the communication channel of the first communication unit includes at least the control channel;
  determining an energy measurement associated with the control channel based, at least in part, on the subset of the frequency domain samples of the RF signal;
  determining whether the control channel includes a narrowband signal based, at least in part, on a narrowband energy threshold; and
  determining whether the control channel includes a control packet associated with the second communication unit based, at least in part, on comparing the energy measurement associated with the control channel against an energy jump threshold and on whether the control channel includes a narrowband signal.

19. The non-transitory machine-readable storage medium of claim 18, wherein said operation of determining the energy measurement associated with the control channel comprises:
  determining a current energy associated with the control channel based, at least in part, on the subset of the frequency domain samples of the RF signal that correspond to the control channel;
  determining an average energy associated with the control channel across a predetermined time interval; and
  determining whether a difference between the current energy and the average energy is greater than the energy jump threshold.

20. The non-transitory machine-readable storage medium of claim 19, wherein said operation of determining whether the control channel includes a control packet associated with the second communication unit further comprises:
  determining whether the control channel includes a narrowband signal in response to determining that the difference between the current energy associated with the control channel and the average energy associated with the control channel is greater than the energy jump threshold;
  determining that the control channel includes a control packet associated with the second communication unit in response to determining that the difference between the current energy and the average energy is greater than the energy jump threshold and in response to determining that the control channel includes a narrowband signal; and
  determining that the control channel does not include a control packet associated with the second communication unit in response to determining that the difference between the current energy and the average energy is less than the energy jump threshold or in response to determining that the control channel does not include a narrowband signal.

21. The non-transitory machine-readable storage medium of claim 18, wherein said operation of determining whether the control channel includes a narrowband signal further comprises:
  identifying a first communication channel and a second communication channel of the second communication unit that are adjacent to the control channel;
  determining an energy associated with the first communication channel and an energy associated with the second communication channel;
  determining whether the energy associated with the first communication channel and the energy associated with the second communication channel are less than the narrowband energy threshold; and
  determining that the control channel includes a narrowband signal in response to determining that the energy associated with the first communication channel and the energy associated with the second communication channel are less than the narrowband energy threshold.

22. The non-transitory machine-readable storage medium of claim 18, wherein the operations further comprise:
  generating an indication identifying the control channel in response to determining that the control channel includes a control packet associated with the second communication unit,
  wherein said operation of generating the indication identifying the control channel comprises:
    storing at least one of a time instant at which the control packet was detected on the control channel, a channel identifier of the control channel on which the control packet was detected, and a difference between a current energy associated with the control channel and an average energy associated with the control channel.

23. The non-transitory machine-readable storage medium of claim 18, wherein the operations further comprise:
  identifying a plurality of control channels on which control packets were detected;
  analyzing, for each of the plurality of control channels, a difference between a current energy associated with the control channel and an average energy associated with the control channel;
  identifying a first control channel of the plurality of control channels that is associated with a highest difference between the current energy and the average energy; and
  designating the first control channel as a target control channel to process a subset of time domain samples of the RF signal that correspond to the target control channel.

24. The method of claim 1, wherein said determining the plurality of frequency domain samples of the RF signal received at the first communication unit and determining whether the control channel includes the control packet associated with the second communication unit is in response to:

determining that the first communication unit has control of a wireless communication medium and that the second communication unit is in a low power operating mode.

25. The method of claim 1, wherein said determining whether the control channel includes a narrowband signal further comprises:
identifying a first communication channel and a second communication channel of the second communication unit that are adjacent to the control channel of the second communication unit; and
determining that the control channel does not include a narrowband signal in response to determining that an energy associated with the first communication channel exceeds the narrowband energy threshold.

26. The method of claim 1, wherein in response to determining that the control channel includes the control packet, the method further comprises:
correlating a predetermined number of time domain samples of the RF signal with a predetermined broadcast address of a network device class that includes the second communication unit; and
determining a packet type of the control packet based, at least in part, on whether the predetermined number of time domain samples was successfully correlated with the predetermined broadcast address.

27. The communication device of claim 15,
wherein the detection unit operable to determine the energy measurement associated with the control channel comprises the detection unit operable to:
determine a current energy associated with the control channel based, at least in part, on the subset of the frequency domain samples of the RF signal that correspond to the control channel;
determine an average energy associated with the control channel across a predetermined time interval; and
determine whether a ratio of the current energy and the average energy is greater than the energy jump threshold; and
wherein the detection unit operable to determine whether the control channel includes a control packet associated with the second communication unit comprises the detection unit operable to:
determine whether the control channel includes a narrowband signal in response to determining that the ratio of the current energy and the average energy is greater than the energy jump threshold; and
determine that the control channel includes a control packet associated with the second communication unit in response to determining that the ratio of the current energy and the average energy is greater than the energy jump threshold and in response to determining that the control channel includes a narrowband signal.

28. The communication device of claim 15,
wherein the detection unit operable to determine the energy measurement associated with the control channel includes the detection unit operable to:
determine a current energy associated with the control channel based, at least in part, on the subset of the frequency domain samples of the RF signal that correspond to the control channel;
determine an average energy associated with the control channel across a predetermined time interval; and
determine whether a difference between the current energy and the average energy is greater than the energy jump threshold; and
wherein the detection unit operable to determine whether the control channel includes a control packet associated with the second communication unit further comprises the detection unit operable to:
determine whether the control channel includes a narrowband signal in response to determining that the difference between the current energy and the average energy is greater than the energy jump threshold; and
determine that the control channel includes a control packet associated with the second communication unit in response to determining that the difference between the current energy and the average energy is greater than the energy jump threshold and in response to the detection unit determining that the control channel includes a narrowband signal.

29. The communication device of claim 15, wherein the detection unit operable to determine whether the control channel includes a narrowband signal further comprises the detection unit operable to:
identify a first communication channel and a second communication channel of the second communication unit that are adjacent to the control channel of the second communication unit;
determine an energy associated with the first communication channel and an energy associated with the second communication channel;
determine whether the energy associated with the first communication channel and the energy associated with the second communication channel are less than the narrowband energy threshold; and
determine that the control channel includes a narrowband signal in response to the detection unit determining that the energy associated with the first communication channel and the energy associated with the second subset of communication channel are less than the narrowband energy threshold.

* * * * *